(12) United States Patent
Guengant et al.

(10) Patent No.: US 12,193,630 B2
(45) Date of Patent: Jan. 14, 2025

(54) INDUSTRIAL SWEEPER PROVIDED WITH AN IMPROVED DEVICE FOR UNCLOGGING THE AIR FILTER THEREOF

(71) Applicant: ETABLISSEMENTS EMILY, Treflevenez (FR)

(72) Inventors: Michel Guengant, Plougar (FR); Michel Morvan, Landerneau (FR); Arnaud Miossec, Plouzevede (FR)

(73) Assignee: ETABLISSEMENTS EMILY, Treflevenez (FR)

( * ) Notice: Subject to any disclaimer, the term of this patent is extended or adjusted under 35 U.S.C. 154(b) by 274 days.

(21) Appl. No.: 17/895,795

(22) Filed: Aug. 25, 2022

(65) Prior Publication Data

US 2023/0054083 A1 Feb. 23, 2023

(30) Foreign Application Priority Data

Jul. 16, 2021 (FR) ...................................... 21/07697

(51) Int. Cl.
*A47L 9/20* (2006.01)
*A47L 5/22* (2006.01)
(Continued)

(52) U.S. Cl.
CPC ................. *A47L 9/20* (2013.01); *A47L 5/22* (2013.01); *A47L 9/009* (2013.01); *A47L 9/0416* (2013.01);
(Continued)

(58) Field of Classification Search
CPC .......... A49L 9/20; A49L 9/009; A49L 9/0416; A49L 9/0472; A49L 9/1409; A49L 9/149;
(Continued)

(56) References Cited

U.S. PATENT DOCUMENTS 3,293,679 A * 12/1966 Murphy .................. E01H 1/047
15/87
3,312,992 A * 4/1967 Schmidt .................. E01H 1/047
15/83
(Continued)

FOREIGN PATENT DOCUMENTS

EP 0320526 A1 6/1989
FR 3087798 A1 5/2020

*Primary Examiner* — C. A. Rivera
(74) *Attorney, Agent, or Firm* — Williams Mullen; R. Brian Drozd

(57) ABSTRACT

An industrial sweeper operates by rolling along a floor to be cleaned, pushed or pulled, including: a brush with a horizontal axis depending on the use position of the industrial sweeper on a horizontal floor, a collecting pan for collecting dirt swept by the brush, the collecting pan mounted and able to pivot between a closed and working position and a wide open position allowing the pan to be emptied, a suction turbine downstream of the collecting pan suctioning dust into the collecting pan when in closed position, two wheels for resting on the floor, an air filter, an unclogging mechanism for unclogging the air filter. The air filter is fixed on the collecting pan and the unclogging mechanism includes an end stop to block travel of the collecting pan in its wide open position, the end stop causing a shock at the end of the collecting pan opening movement.

9 Claims, 10 Drawing Sheets

(51) Int. Cl.
*A47L 9/00* (2006.01)
*A47L 9/04* (2006.01)
*A47L 9/14* (2006.01)
*B01D 46/00* (2022.01)
*B01D 46/74* (2022.01)

(52) U.S. Cl.
CPC ........... *A47L 9/0472* (2013.01); *A47L 9/1409* (2013.01); *A47L 9/149* (2013.01); *B01D 46/0006* (2013.01); *B01D 46/74* (2022.01); *B01D 2271/02* (2013.01); *B01D 2279/55* (2013.01)

(58) Field of Classification Search
CPC ..... A47L 5/22; B01D 46/006; B01D 2271/02; B01D 2279/55; E01H 1/0845; E01H 1/047
See application file for complete search history.

(56) References Cited

U.S. PATENT DOCUMENTS

| | | | | |
|---|---|---|---|---|
| 4,327,455 A | * | 5/1982 | Burgoon | ................. A47L 11/40 15/83 |
| 4,580,313 A | * | 4/1986 | Blehert | ................... A47L 11/24 15/352 |
| 5,254,146 A | | 10/1993 | Beaufoy | |

\* cited by examiner

[Fig. 1]
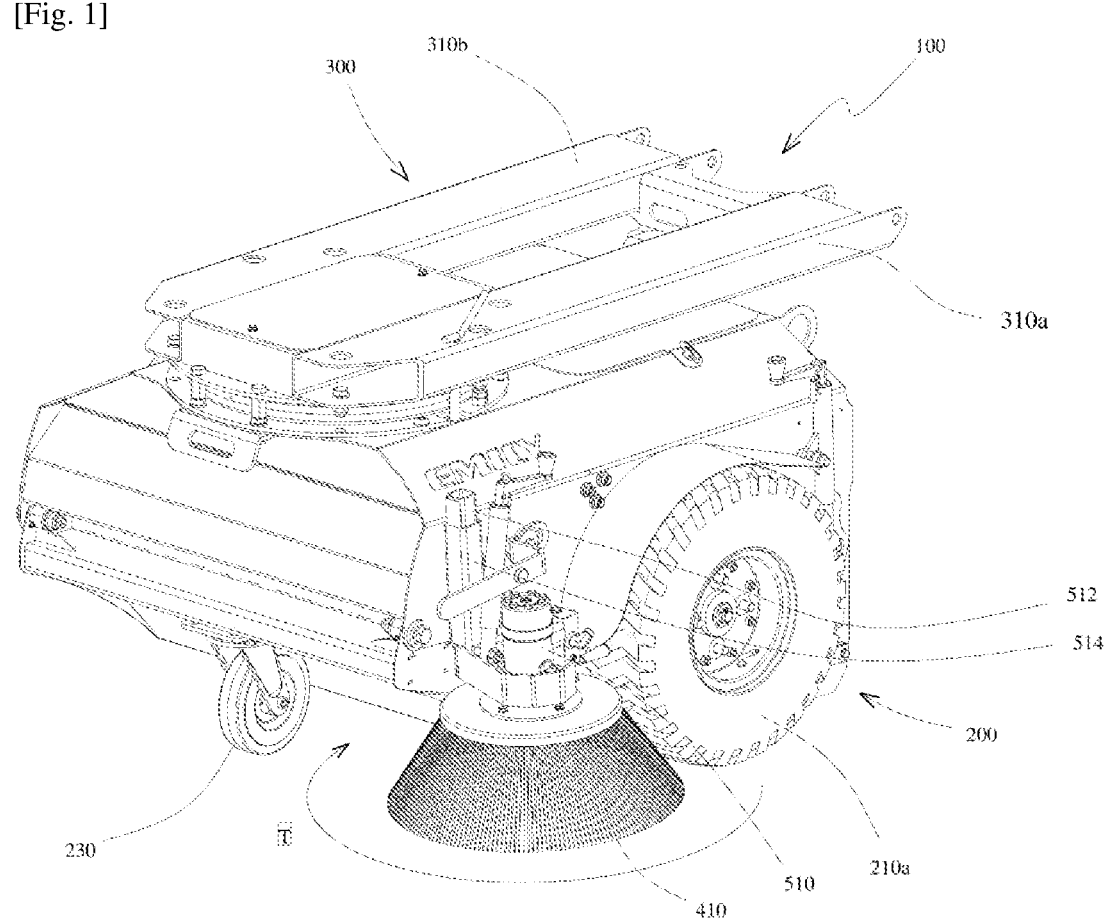
[Fig. 2]
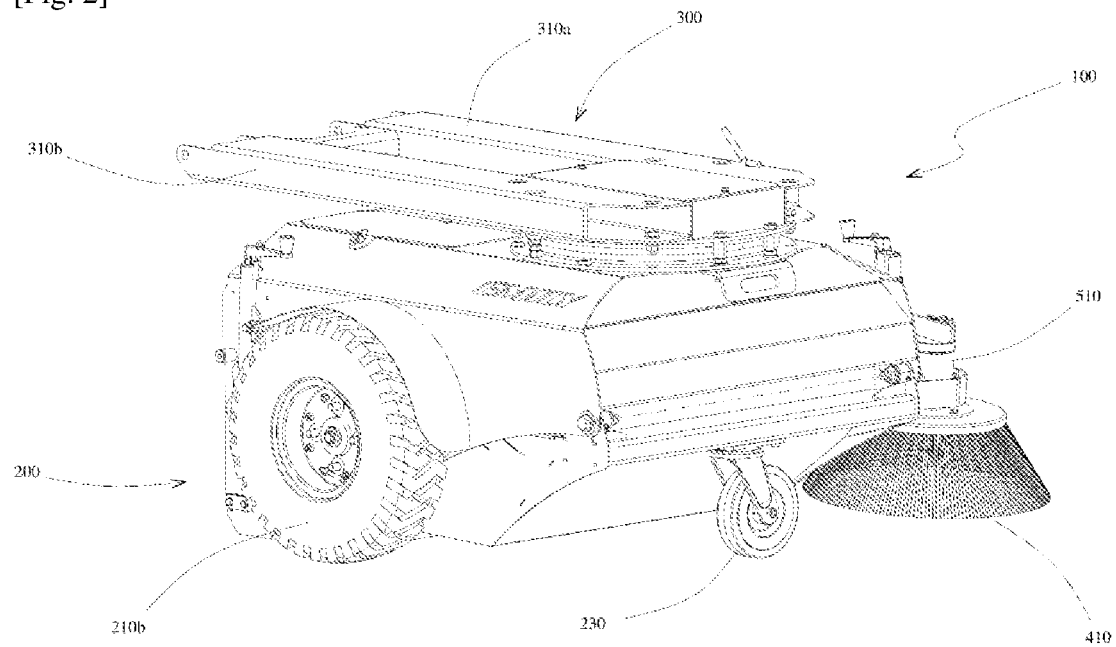

[Fig. 3]
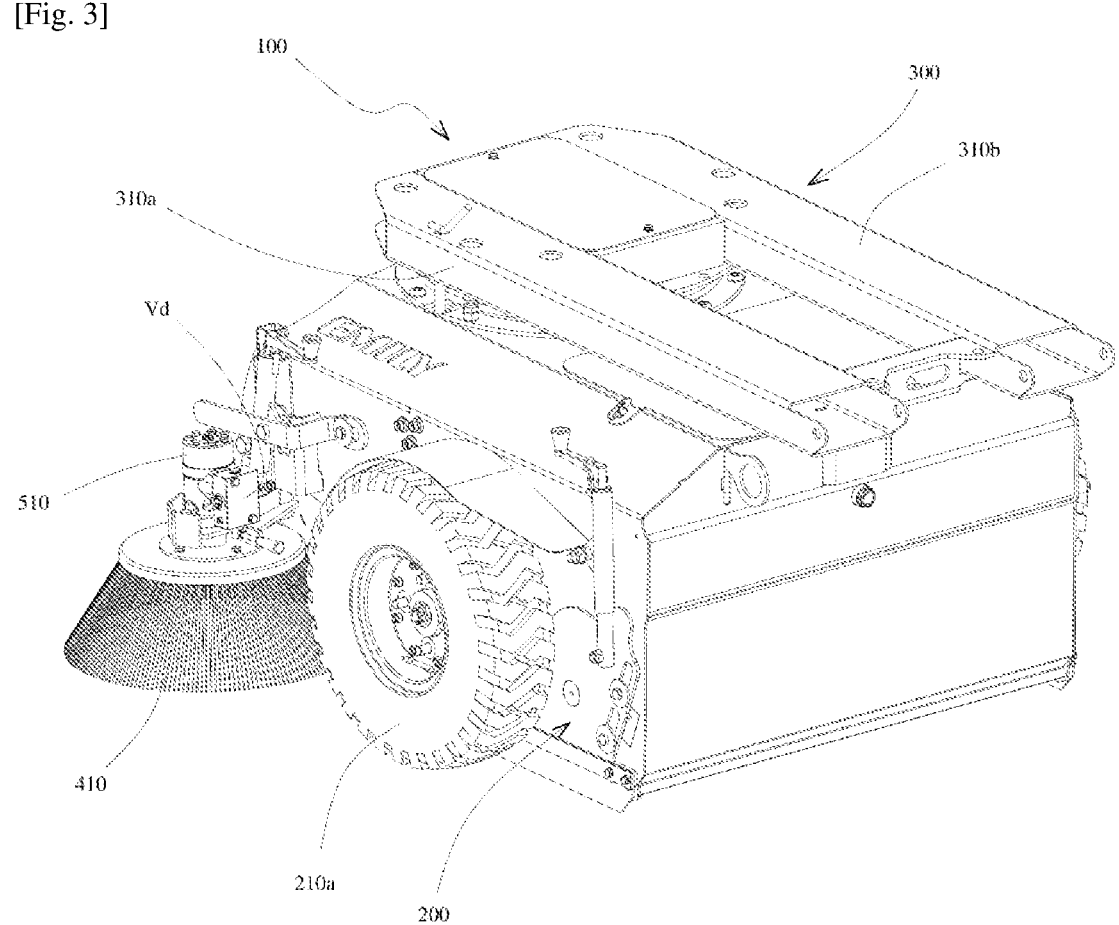

[Fig. 4]
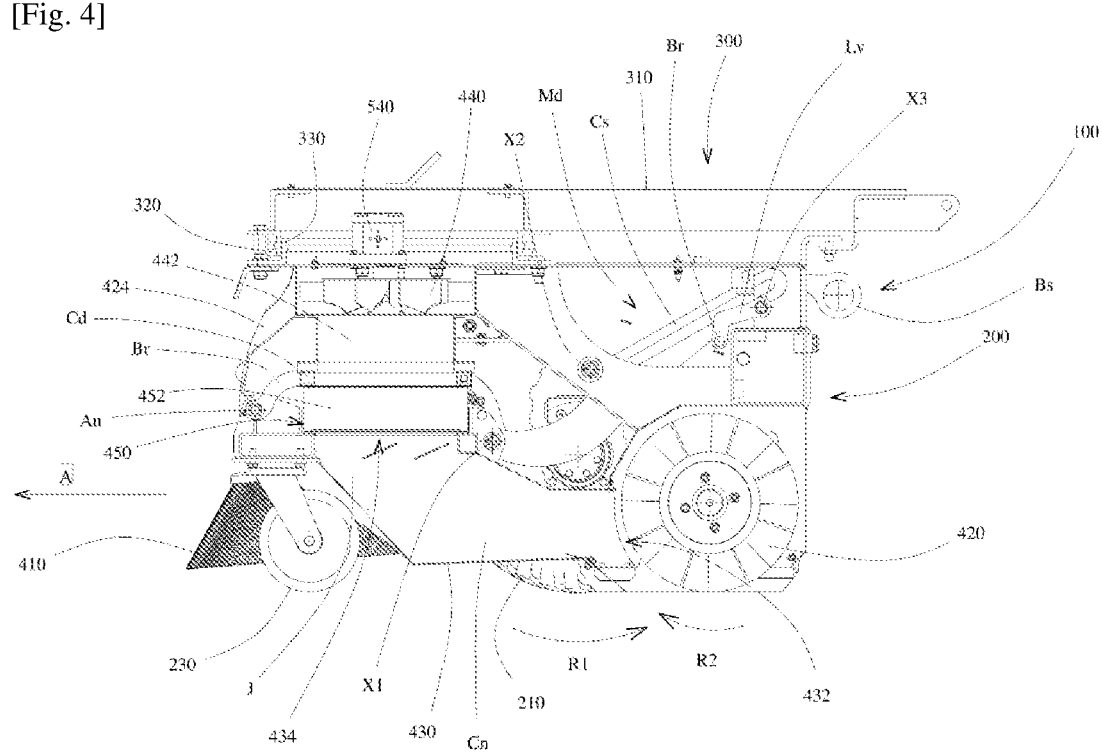

[Fig. 5]
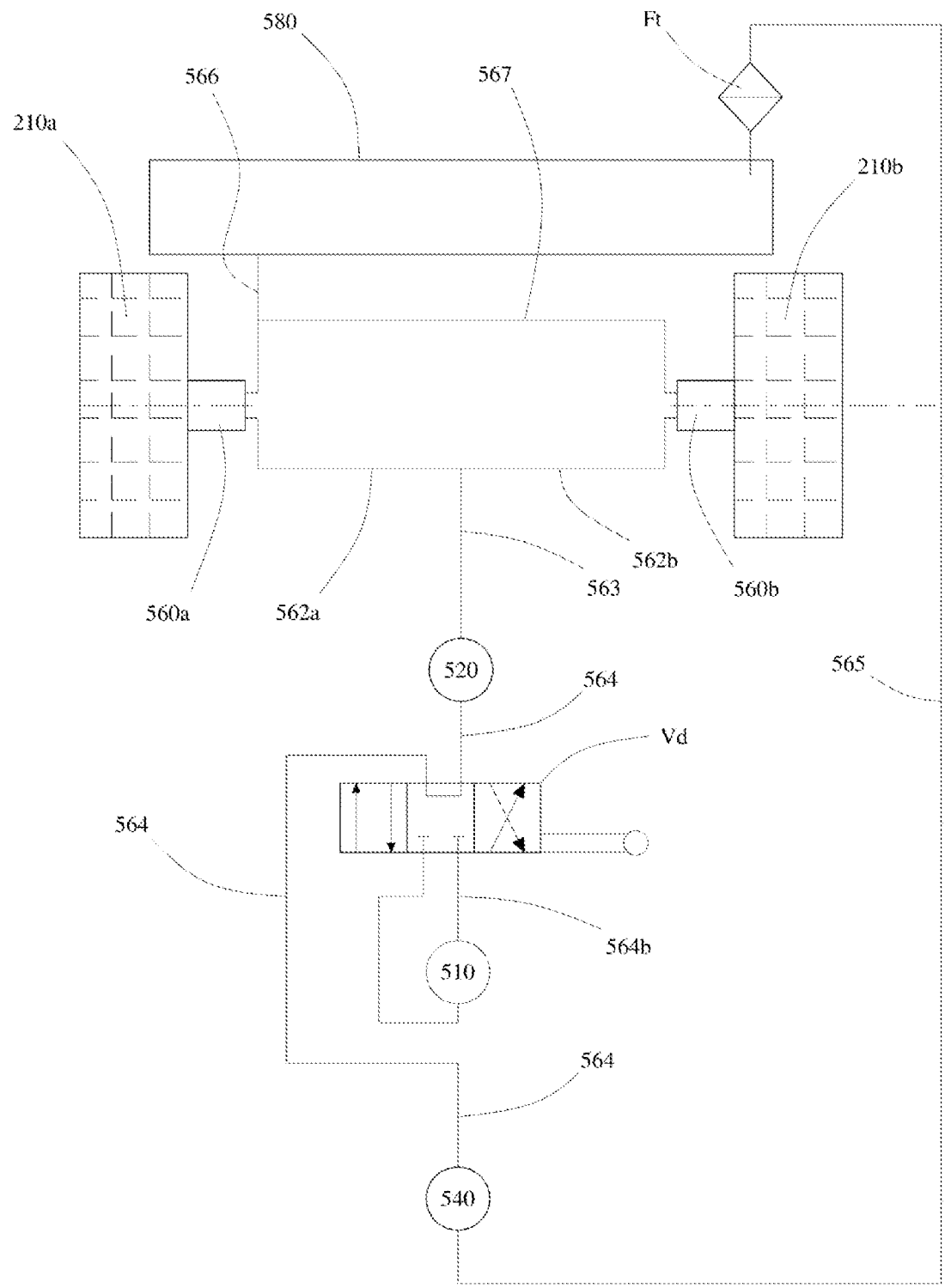

[Fig. 6]
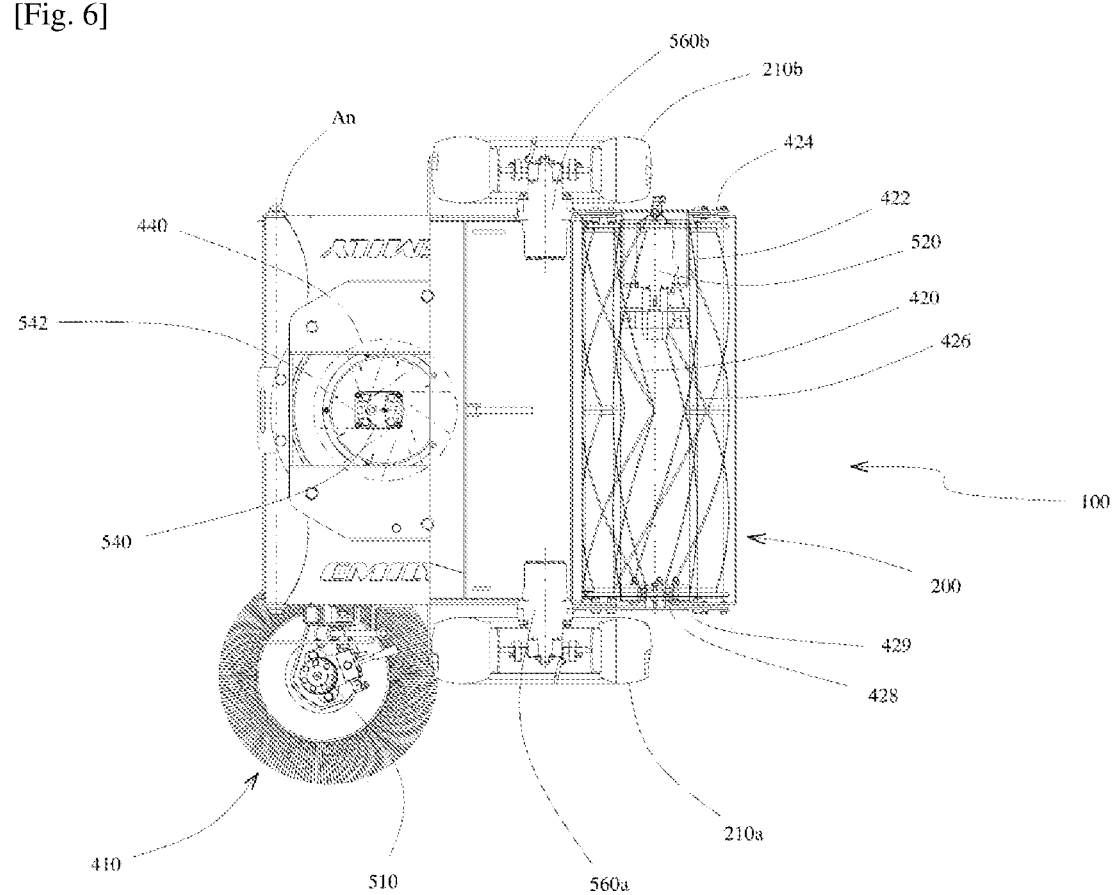

[Fig. 7]
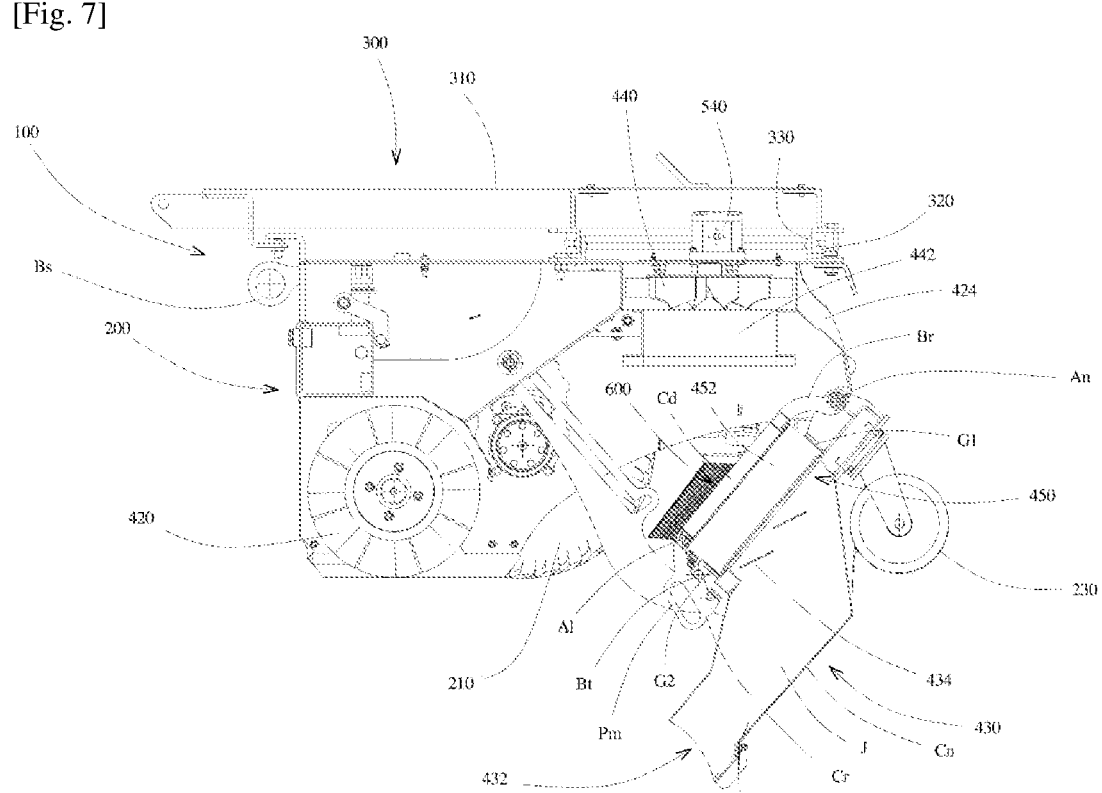
[Fig. 8]
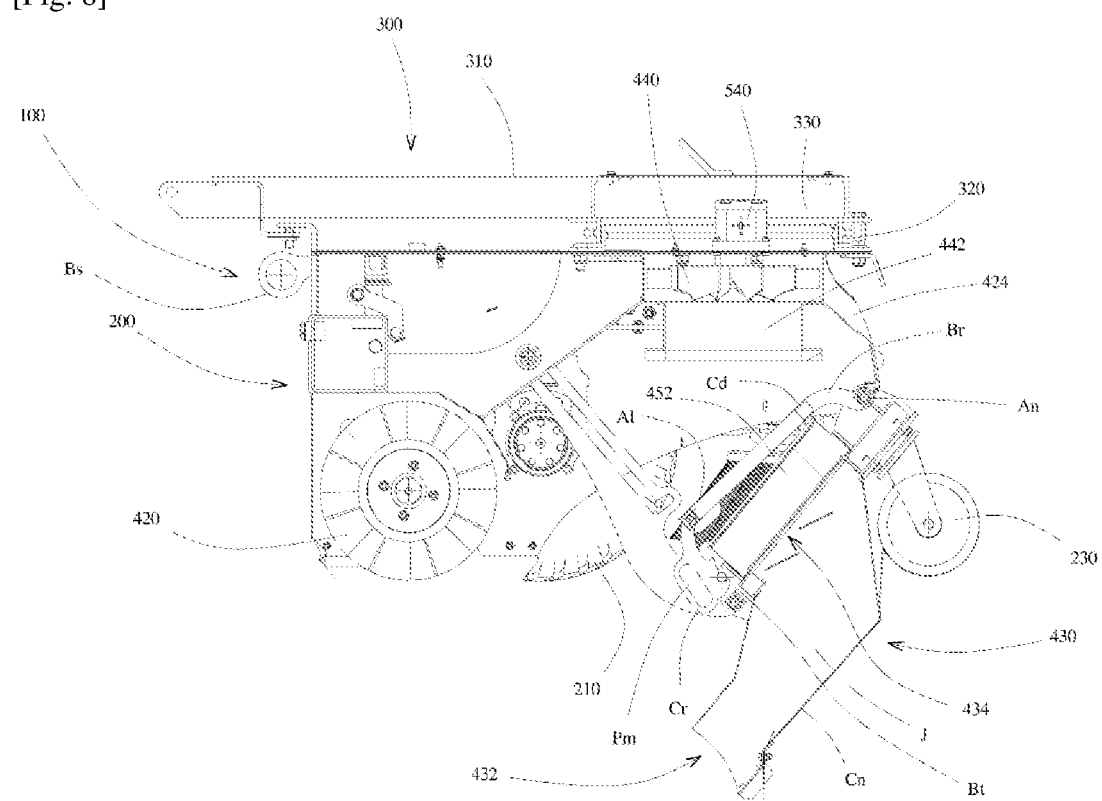

[Fig. 9]
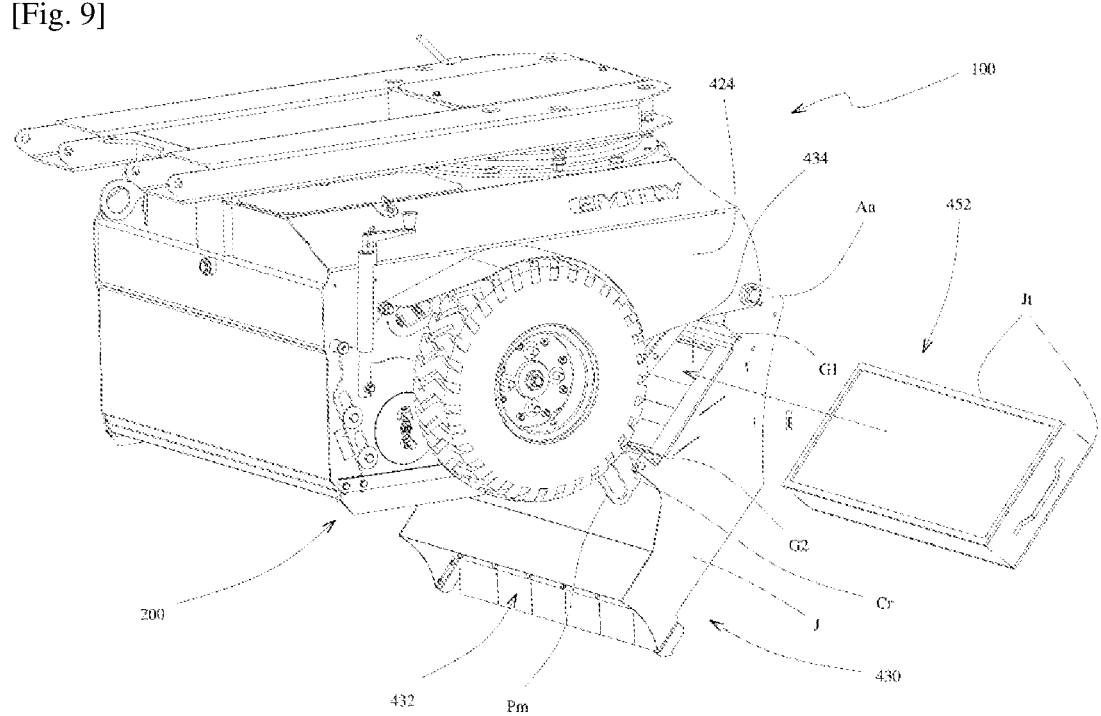

[Fig. 10]
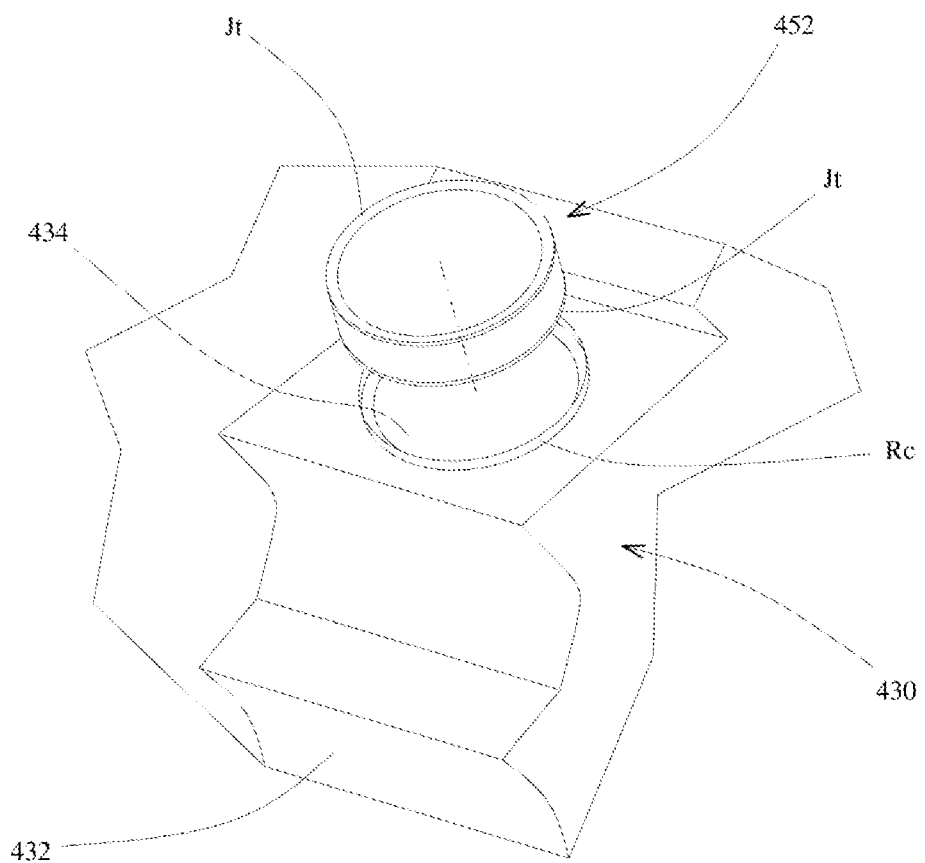

[Fig. 11]
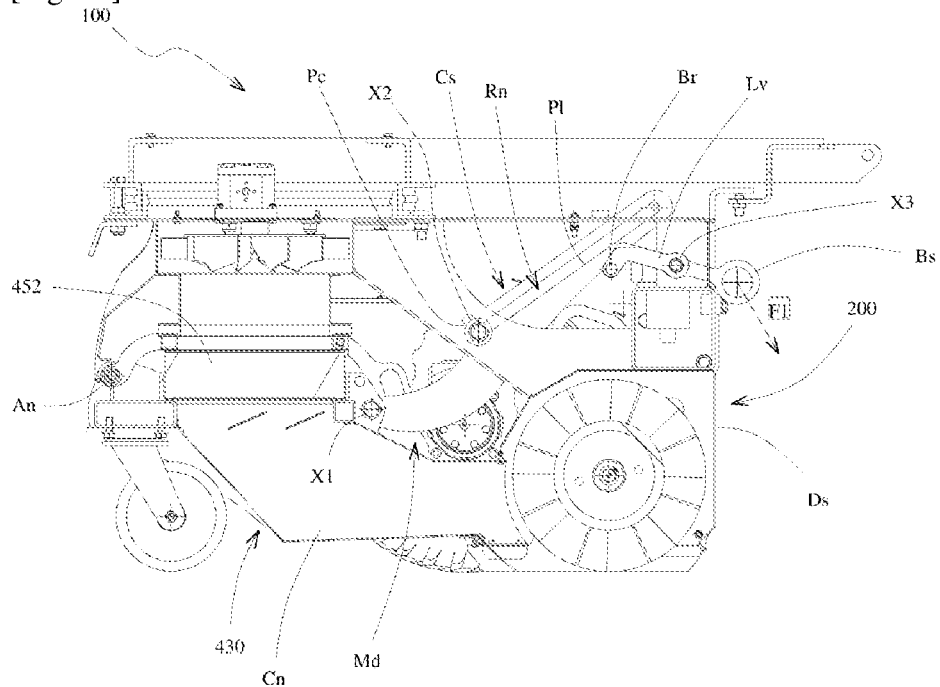
[Fig. 12]
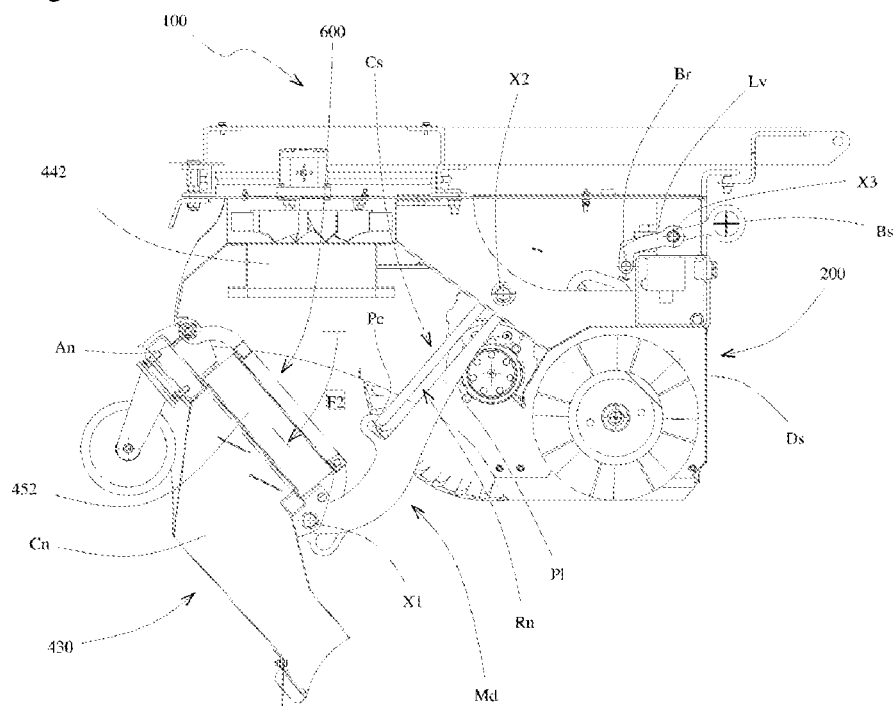

[Fig. 13]
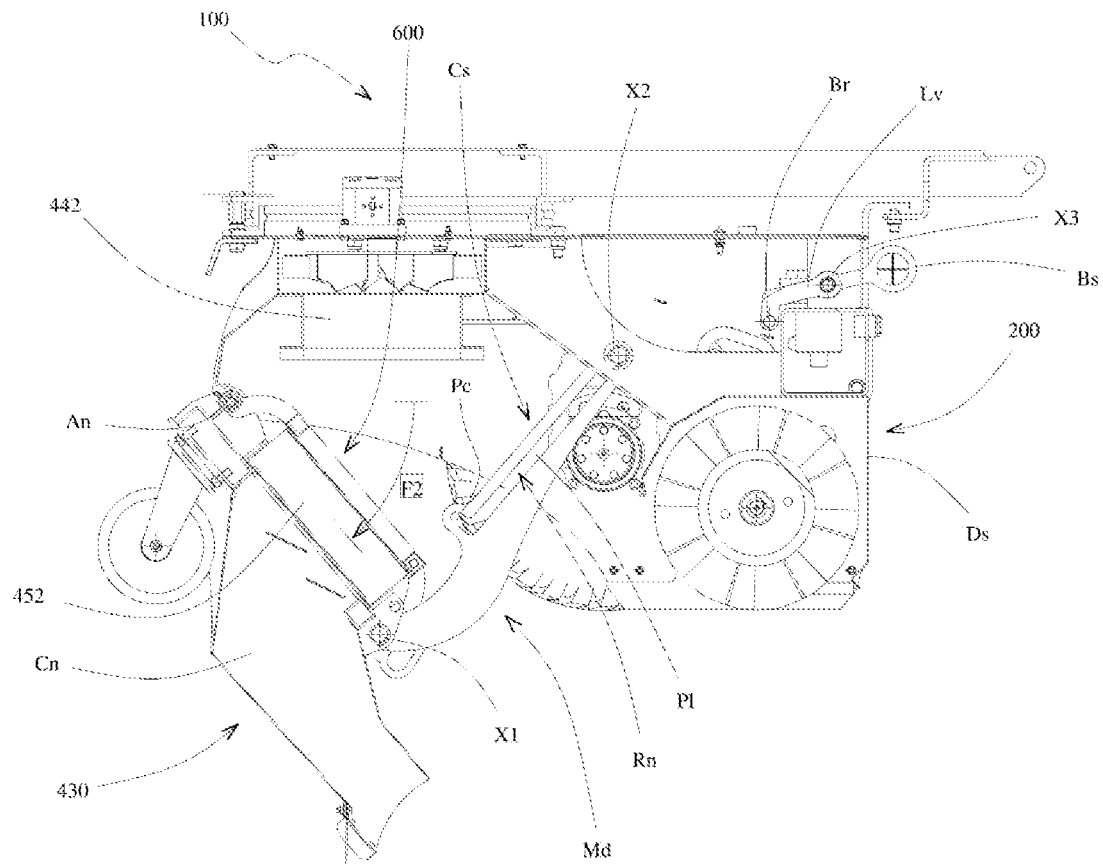
[Fig. 14]
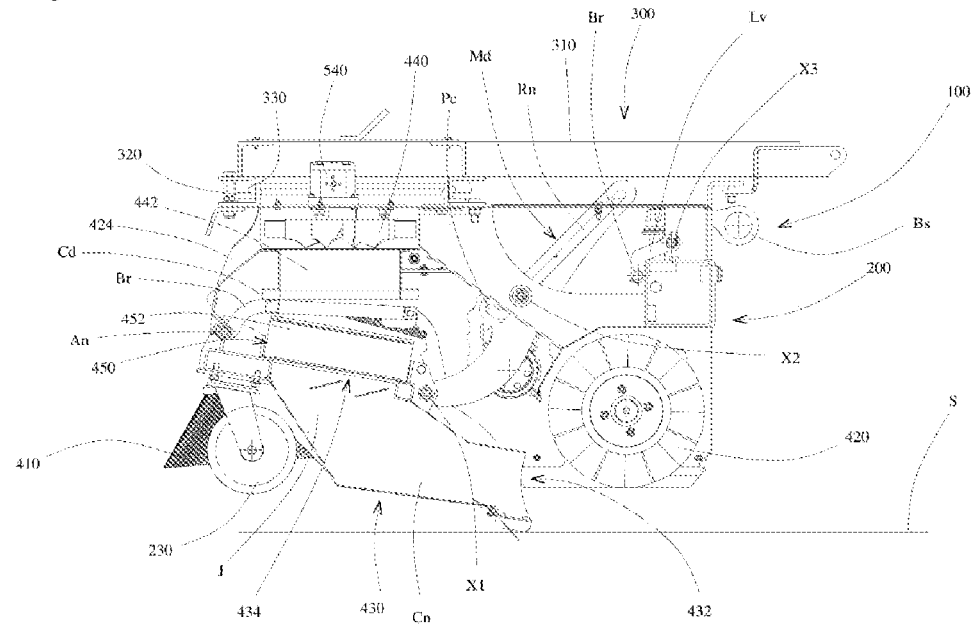

INDUSTRIAL SWEEPER PROVIDED WITH AN IMPROVED DEVICE FOR UNCLOGGING THE AIR FILTER THEREOF

The present invention relates to an industrial sweeper intended to clean relatively expansive floors.

The patent application published under No. FR3087798 sets out an industrial sweeper with autonomous operation, which is to say which is designed to operate by simply rolling over a floor that is to be cleaned, pushed or pulled.

The industrial sweeper comprises:
- a brush with an axis that is horizontal when considering the position of use of the industrial sweeper on a horizontal floor,
- a collecting pan intended to collect the dirt swept by the brush during operation of the sweeper,
- a suction turbine situated downstream of the collecting pan to encourage, by suction, the dust to enter said collecting pan,
- at least one wheel intended to rest on the floor that is to be cleaned in order to drive said brush and said turbine as the sweeper moves over the floor,
- a filter-bearing frame interposed between the collecting pan and said turbine and intended to accept an air filter,
- an unclogging device designed to act on the filter-bearing frame comprising at least one push-rod borne by the filter-bearing frame, at least one striker mechanically connected to the collecting pan and designed to sequentially strike said push rod during the movement of opening the collecting pan.

Thus, when an air filter is mounted in the filter carrier, it is cleaned percussively each time the collecting pan of the sweeper is emptied.

Although the unclogging device operates correctly, the following disadvantages should, however, be noted:

During the movement of opening the collecting pan, which movement causes the striker to repeatedly strike the air filter, dust spreads around the sweeper. This dust may also enter the suction chamber of the turbine. Dust also settles on the seal between the air filter and the filter-bearing frame. The unclogging device is fairly complicated to manufacture, notably because of the presence of a rack and of a pinion.

On the basis of this observation, the applicant has sought to design an industrial sweeper including an unclogging device and that can be simpler and more effective.

To that end, what is proposed is an industrial sweeper designed to operate by rolling along a floor that is to be cleaned, pushed or pulled, comprising:
- a brush with an axis that is horizontal when considering the position of use of the industrial sweeper on a horizontal floor,
- a collecting pan intended to collect the dirt swept by the brush during operation of the industrial sweeper, the collecting pan being mounted with the ability to pivot about an articulation that is offset laterally from the centre of gravity of the collecting pan between a closed and working position of the industrial sweeper and a wide open position allowing said collecting pan to be emptied,
- a suction turbine situated downstream of the collecting pan to encourage, by suction, the dust to enter said collecting pan when it is in its closed position, two wheels intended to rest on the floor that is to be cleaned,
- an air filter, fixed to the collecting pan, and
- an unclogging mechanism for unclogging the air filter comprising an end stop designed to block the travel of the collecting pan in its wide open position, the end stop causing a shock at the end of the opening movement of the collecting pan, wherein the passage from the closed position to the wide open position occurs under the effect of gravity.

Thus, when the collecting pan is dropped from its closed position, the end-stop abruptly halts the opening movement of the collecting pan at the end of its travel. The shock thus generated in the collecting pan unclogs the air filter fixed to the collecting pan. The dust ejected from the air filter remains confined to the collecting pan. The environment around the machine remains free of dust. The air filter is cleaned each time the collecting pan of the industrial sweeper is emptied.

According to an additional feature of the invention, the collecting pan comprises a box of L-shaped cross section, provided with a dust and dirt intake opening, with an air outlet opening, the air filter being fixed around the air outlet opening and wherein, in the open position, the collecting pan is emptied through the intake opening.

The air filter is positioned around the air outlet opening.

According to an additional feature of the invention, two guideways for guiding the air filter are positioned opposite one another while being fixed to two transverse edges delimiting the air outlet opening, the air filter having a geometry in the shape of a parallelepiped or prism, the air filter being inserted between the two guideways, This construction allows the air filter to be inserted into the collecting pan when it is positioned in its open position, in the manner of a drawer.

According to an additional feature of the invention, the air filter is delimited by two open main faces uncovering the filter element, one of them being a lower face, for admitting air, and the other and upper face for letting filtered air out, two seals being fixed to the perimeter of the two main faces of said air filter, the air filter being fixed around the air outlet opening, via an applicator comprising a frame or a ring mounted in an articulated manner and able to bear against the perimeter seal of the upper face of the air filter.

The applicator is thus able to keep the air filter applied to the air outlet opening of the box.

According to an additional feature of the invention, the end stop comprises a slider mounted in an articulated manner via one end to the collecting pan by means of an axis common with the collecting pan, the slider having passing through it a slot able to slide along a second axis secured to a chassis that forms part of the sweeper, the slot comprising a long part and the free end of which defines, in collaboration with the second axis, the end stop that determines the wide open position of the collecting pan.

The abrupt shock thus generated in the collecting pan by the slider reaching its end stop unclogs the air filter fixed to the collecting pan. The dust ejected from the air filter by the unclogging action remains in the collecting pan.

According to an additional feature of the invention, the long part of the slot is extended in the bottom part of this slot by a short part which extends upwards, the end of the short part of said slot defining, with its engagement on the second axis such as a lock, the closed position of the box.

The lock that forms part of the slider is thus able to block the collecting pan in its closed position.

As an embodiment variant, the unclogging mechanism comprises a cable one end of which is fixed to a chassis which forms part of the industrial sweeper and the other end of which is fixed to an axis common with the collecting pan, the taut cable forming an end stop for the opening movement of the collecting pan and thus determining the wide open position thereof, and the industrial sweeper is equipped with a lock for automatically blocking the collecting pan when it is returned to its closed position, the lock including a retractable lock bolt.

The cable, when it becomes taut, forms an end stop for the opening movement of the collecting pan and thus determines the wide open position of the collecting pan. The shock brought about by the abrupt halting of the opening movement of the collecting pan unclogs the air filter. The dust ejected from the air filter is collected in the collecting pan.

As an embodiment variant, the unclogging mechanism comprises a radial end stop borne by a shaft constituting the articulation, a fixed second end stop borne by a chassis that forms part of the industrial sweeper and that collaborates with the radial end stop in order to limit the rotation of the collecting pan about the articulation to its wide open position.

The action of the two end stops coming into contact with one another halts the opening movement of the collecting pan, thus determining the wide open position of the collecting pan. The shock brought about by the abrupt halting of the opening movement of the collecting pan unclogs the air filter. The dust ejected from the air filter is collected in the collecting pan.

According to an additional feature of the invention, the industrial sweeper comprises two hydraulic pumps respectively rotationally driven by the two main wheels of the industrial sweeper, three hydraulic motors coupled in series and supplied by the two hydraulic pumps to respectively drive the rotation of the horizontal-axis brush, a lateral brush and the suction turbine.

The industrial sweeper can thus operate autonomously, by simply being pushed or pulled.

The abovementioned features of the invention, together with others, will become more clearly apparent from reading the following description of one embodiment, said description being given with reference to the attached drawings, among which:

FIG. 1 depicts a perspective front view of an industrial sweeper according to the invention, FIG. 2 depicts a perspective front view from another angle of an industrial sweeper according to the invention, FIG. 3 depicts a perspective rear view of an industrial sweeper according to the invention, FIG. 4 depicts a side view in cross section of an industrial sweeper with the collecting pan with which it is provided placed in a closed position according to the invention, FIG. 5 depicts a diagram of a hydraulic circuit of an industrial sweeper according to the invention, FIG. 6 depicts a view from above, in cross section, of an industrial sweeper according to the invention, FIG. 7 depicts a side view in cross section of an industrial sweeper with the collecting pan with which it is provided placed in a disengagement position, an air filter being pressed firmly against the collecting pan by an applicator placed in an engagement position according to the invention, FIG. 8 depicts a lateral view in cross section of an industrial sweeper with the collecting pan with which it is provided placed in a disengagement position, an air filter being disengaged from the collecting pan by the applicator placed in a disengagement position according to the invention, FIG. 9 depicts a perspective front view of an industrial sweeper and of its air filter extracted from its collecting pan according to the invention, FIG. 10 shows an embodiment variant of an air filter positioned on a collecting pan that forms part of an industrial sweeper according to the invention, FIG. 11 depicts a side view in cross section of an industrial sweeper with the collecting pan with which it is provided placed in a closed position according to the invention, FIG. 12 depicts a side view in cross section of an industrial sweeper with the collecting pan with which it is provided unlocked according to the invention, FIG. 13 depicts a side view in cross section of an industrial sweeper with the collecting pan with which it is provided pivoted into a disengagement position according to the invention, and FIG. 14 depicts a side view in cross section of an industrial sweeper with the collecting pan with which it is provided in the process of being moved back up towards a closed position according to the invention.

The industrial sweeper 100 shown in FIGS. 1, 2 and 3 is intended to clean relatively expansive floors, for example the floor of a workshop, the floor of a storage building. It is shown in its position of use.

The industrial sweeper 100 is intended to be moved over the floor by a motorized lifting vehicle, such as a forklift truck, so that it can sweep and pick up dirt, dust and rubbish lying on the floor.

The industrial sweeper 100 is made up of a chassis 200 supporting the constituent parts of this sweeper and which is supported by two main wheels, a left wheel 210a and a right wheel 210b, and by a castor 230 mounted freely at the front of the chassis 200, thus allowing the industrial sweeper 100 to move over the floor following a rectilinear or non-rectilinear path initiated by the driving of the motorized lifting vehicle.

The presence of this castor also allows the industrial sweeper to rest on the floor with three points of contact, thus giving it good stability. As a preference, the two main wheels 210a and 210b bear the majority of the mass of the industrial sweeper. They have a common axis of rotation.

The chassis 200 consists mainly of an all-welded assembly.

The industrial sweeper 100 is provided with a means 300 allowing it to be moved around by the motorized lifting vehicle. In these FIGS. 1, 2 and 3, this means 300 is designed to be held in the forks of the motorized lifting vehicle so that, on the one hand, this vehicle can, by pushing it, move the industrial sweeper over the floor in order to clean same and, on the other hand, the vehicle can lift the sweeper up off the floor in order to move it around quickly, for example to a storage location or to empty a collecting pan with which it is provided.

This means 300 comprises at least one sleeve 310 mounted with the ability to rotate about a vertical axis when considering the industrial sweeper resting on the floor. In these FIGS. 1, 2 and 3, the means 300 comprises two sleeves 310a and 310b, the dimensions of which are suitable for being able to be slipped over the two prongs of the fork of the motorized lifting vehicle.

In FIG. 4, the two sleeves 310 are fixed to a first ring 320 which is mounted with the freedom to rotate via balls in a second ring 330 secured to the upper part of the chassis 200 of the industrial sweeper 100, such as a ball bearing.

The relatively large diameter of these rings 320, 330 allows the vehicle to lift the industrial sweeper without deforming the chassis thereof. The vertical axis common to these two rings is situated forward of the axis of the main wheels 210, when considering the direction of forward progress of the industrial sweeper embodied by the arrow A, so that the sweeper can follow the path initiated by the vehicle, forcing its freely mounted wheel 230 to change direction.

While the industrial sweeper is moving over the floor, the two main wheels 210 drive rotary accessories that are needed, in particular, for the sweeping and suction operation.

In FIG. 4, these accessories are made up of at least one brush 410 of near-vertical axis, positioned at the front and to the side of the industrial sweeper 100 and the purpose of which is to bring dirt in under the industrial sweeper, with a horizontal-axis brush 420 placed in the rear part of the industrial sweeper to sweep the floor and pick up the dirt brought in by the brush 410 and send it into a collecting pan 430, with a turbine 440 situated downstream of the collecting pan so as to encourage, by suction, the dust to enter the collecting pan 430. The axis of the brush 420 is perpendicular to the direction of forward progress A of the industrial sweeper for sending the dust and dirt into the collecting pan 430.

The brush 410 has the appearance of a truncated cone. In practice, its axis is not exactly vertical because it is oriented in such a way that the brush 410 touches the ground at its front part, again when considering the direction of forward progress A of the industrial sweeper. It rotates in the direction indicated by the arrow T in FIG. 1, to bring dirt in under the industrial sweeper as it progresses. The brush 410 is notably used for sweeping the edges. It can be deactivated.

In FIG. 4, the horizontal-axis brush 420 has the appearance of a cylinder. It rotates in the opposite direction to the wheels, as indicated by the two arrows R1 (wheels) and R2 (brush) to bring the dirt towards the collecting pan 430 as the industrial sweeper progresses. The collecting pan 430 is visible under the industrial sweeper. It is made up of a closed box Cn of L-shaped cross section, but which is nevertheless provided with two openings 432 and 434. One of these two openings, the opening 432, is an opening for admitting dust into said box, and it opens level with the brush 420 and downstream thereof (when considering its direction of rotation). The other opening 434 is an air outlet opening and it opens to a filtration means 450 here consisting of an air filter 452 placed under the turbine 440. The air outlet opening 434 opens under the air filter 452. The turbine 440 is positioned in a suction chamber beneath which is fixed a hood 442 into which said suction chamber opens.

The box Cn is bordered laterally by two flanges J which rise up inside the industrial sweeper 100, when the box Cn is in the closed position. One end of these two flanges J has passing through it an articulation An the axis of which is horizontal, in the position of use of the industrial sweeper 100 and which also passes through the front part of the industrial sweeper, when considering its direction of progress. The articulation An is held between two flanges that form part of the chassis 200 of the industrial sweeper 100. Only one flange 424 is visible in this FIG. 4 in section.

The operation of this turbine 440, through suction, generates a stream of air entering via the intake opening 432 and exiting via the air outlet opening 434 to suck the dust in suspension under the industrial sweeper into the collecting pan 430. The air filter 452 retains this dust while the industrial sweeper is in operation.

The filtered air is expelled by the turbine 440 through passages that pass through the flanges of the chassis 200.

In FIG. 6, the lateral brush 410, the horizontal-axis brush 420 and the suction turbine 440 are respectively rotationally driven by three hydraulic motors 510, 520 and 540, supplied by two hydraulic pumps 560a and 560b. These two hydraulic pumps are respectively rotationally driven by the two main wheels 210a and 210b of the industrial sweeper 100.

In FIG. 1, the motor 510 that drives the brush 410 is mounted in a fixing leg 512 which is mounted with the ability to slide in a sleeve 514. A maneuvering means 516, such as a cylinder with a cranking handle, allows adjustment of the height of the motor 510 and therefore of the height of the brush which is mounted directly on the axle of said motor.

In FIG. 6, the motor 540 for driving the turbine 440 is fixed to a plate 542 secured to the chassis 200 of the industrial sweeper 100. This motor 540 is of the high rotational speed type so as to directly drive the turbine at its effective nominal speed.

The motor 520 for driving the horizontal-axis brush 420 is housed in a casing 422 secured to the first flange 424 that forms part of the chassis 200 of the industrial sweeper 100. The casing 422 is housed in one end of a sleeve 426, supporting at its periphery the brushing elements of the brush 420 so that the motor 520 can drive said brush. The sleeve 426 is also held at its other end in a bearing 428 secured to the second flange 429 that forms part of the chassis 200.

In FIG. 5, the two hydraulic pumps 560a and 560b are connected in parallel to supply, sequentially, the hydraulic motors 520, 510 and 540 which are coupled in series. Thus, the drive torque supplied by the two wheels while the industrial sweeper is being driven by running over the floor is used entirely by the two hydraulic pumps 560a and 560b supplying the hydraulic motors 520, 510 and 540.

When the industrial sweeper progresses along a curved path, the two wheels 210a and 210b rotate at different speeds. Logically, they drive the two hydraulic pumps 560a and 560b at different speeds, although their outputs are summed so that the power supplied by the two hydraulic pumps 560a and 560b is substantially identical, for a given speed of forward progress of the industrial sweeper, whether it is moving in a rectilinear path or moving in a curved path. The two hydraulic pumps 560a and 560b are always in operation regardless of the path of the industrial sweeper. Furthermore, the three motors 520, 510 and 540 are connected in series so that they are all supplied with the same flowrate. The effectiveness of the industrial sweeper 100 can be optimized for a given range of speeds.

Through this arrangement, the movement of the industrial sweeper over the floor by the motorized lifting vehicle causes the two hydraulic pumps 560 to be driven and these pumps thus supply the various motors in series. The order in which the motors are connected is preferably as follows. The first motor supplied is the motor 520 that drives the horizontal-axis brush; the second motor 510 driving the conical brush and the third motor 540 is the one that drives the turbine.

With reference to FIG. 5, the hydraulic coupling is as follows:

The outlet ports on the pressure side of the two hydraulic pumps 560a and 560b are thus coupled respectively to two pipelines 562a and 562b which are coupled to a pipeline 563 that supplies the first motor 520. Other pipelines 564 respectively connect the outlet port on the pressure side of a motor to the supply port of the next motor. Another return pipeline 565 connects the outlet port of the last motor 540 to a hydraulic fluid storage tank 580. A hydraulic filter Ft is interposed between this pipeline 565 and the tank 580. This tank 580 is positioned above the two hydraulic pumps 560a and 560*b* and gravity-feeds these pumps with fluid via two pipelines 566 and 567 of which one, 567, in this FIG. 5 is branched off the other.

Because a simple pipeline suffices for supplying each of the motors in series, each motor can be positioned in such a way that it directly drives the corresponding accessory.

A manually operated diverter valve Vd is tapped off the portion of pipeline 564 that connects the hydraulic motor 520 to the hydraulic motor 510, via a pipeline 564*b* on each side of the hydraulic motor 510, so that by operating the valve Vd, the operation of said hydraulic motor 510 bearing the lateral brush can be deactivated. The diverter valve Vd in this FIG. 5 is a manually operated directional valve of the 4/3 type. The diverter valve Vd is fixed, as can be seen in FIG. 3, to the hydraulic motor 510. It controls whether the brush 410 operates in one direction of rotation, whether the operation of the brush 410 is halted, or whether the brush 410 is operated in its other direction of rotation.

Use is preferably made of hydraulic pumps of relatively high displacement which, in the invention, can be used without a speed multiplier.

In an embodiment variant which has not been depicted, the industrial sweeper does not have the hydraulic storage tank or the two hydraulic pumps but retains its hydraulic motors. The motorized lifting vehicle is equipped with a hydraulic pump.

The motors of the industrial sweeper are coupled to the hydraulic pump of the motorized lifting vehicle via hydraulic couplings.

The collecting pan 430 is mounted in an articulated and pivoting manner about its articulation An so that it can pivot between a closed working position of the industrial sweeper, visible in FIG. 4, in which the longest part of the L-shaped geometry of its box Cn extends in a near-horizontal direction under the industrial sweeper 100 so that its intake opening 432 can collaborate with the brush 420 while holding the dirt inside said collecting pan, and a wide open position visible in FIG. 7 in which the longest part of the L-shaped geometry of the box Cn extends obliquely so as to allow the content of the collecting pan 430 to be emptied from underneath the industrial sweeper, for example into a waste collection container. The lateral position of the articulation An is offset laterally from the centre of gravity of the collecting pan 430. The latter can thus open under the effect of gravity to its open position.

The industrial sweeper 100 has been lifted up by the motorized lifting vehicle and then brought over the waste collecting container so that the collecting pan 430 can be emptied. After the industrial sweeper 100 has been lifted up, the passage from the closed position to the wide open position occurs under the effect of gravity and the collecting pan 430 thus pivots downwards to present the intake opening 432 so that it faces downwards.

The emptying of the collecting pan 430 is done in its open position, through the intake opening 432 oriented obliquely downwards.

In the invention, the air filter 452 is fixed to the collecting pan 430. It thus moves in the same way as the collecting pan 430 during the pivoting thereof. The air filter 452 is fixed against the air outlet opening 434 of the collecting pan 430 by an applicator 600 which clamps it onto the collecting pan 430.

The air filter 452 in FIG. 9 preferably exhibits a geometry in the shape of a parallelepiped or prism, delimited by two open main faces uncovering the filter element, one of them being a lower face for admitting air into the air filter 452 and the other being an upper face for letting the filtered air out.

Two seals Jt are fixed to the perimeter of the two, upper and lower, main faces of the air filter 452.

The air filter 452 is inserted beforehand and laterally between two guideways G1 and G2, positioned facing one another and fixed to two transverse edges delimiting the air outlet opening 434. The arrow I shows the direction of insertion of the air filter 452 between the two guideways G1 and G2. An end stop, not depicted, secured to the box Cn, limits the insertion travel of the air filter 452 into said box. The air filter 452 thus remains positioned around the air outlet opening 434.

Thus, and when the collecting pan 430 is in the open position visible in FIG. 7, the dust and dirt remain confined inside the collecting pan 430 and can re-emerge therefrom only via the opening 432. The industrial sweeper remains relatively clean while in use.

The applicator 600 is designed, on the one hand, to apply the air filter 452 to the air outlet opening 434 of the collecting pan 430 and, on the other hand, to unblock the air filter from its operational location so that it can be removed for cleaning, and then reinstalled or else replaced if need be.

The applicator 600 consists, in FIGS. 7 and 8, of a frame Cd resting against the perimetral seal of the upper face of the air filter 452, the frame Cd being held by two arms Br mounted in an articulated manner, advantageously about the articulation An. Two hooks Cr are fixed to the frame Cd, and on the other side of the arms Br, so as both to catch on a retaining bar Bt that connects the two flanges J of the collecting pan 430.

When the collecting pan 430 is in the closed position visible in FIG. 4, the frame Cd rests against the perimeter of the outlet of the hood 442. The perimeter of this outlet of the hood 442 is equipped with a perimeter seal which collaborates with the frame Cd to afford sealed assembly between the hood 442 and the box Cn.

In FIGS. 7 and 8, the frame Cd is formed of four hollow rods assembled in twos at right angles. The two hooks Cr are fixed at the two ends of a common connecting axis A1 which is held in a transverse rod.

One of the two hooks Cr is equipped with a maneuvering handle Pm intended to pivot the two hooks Cr about their common connecting axis A1 between a position of blocking the air filter 452 on the collecting pan 430, which position is visible in FIG. 7, and a position for disengagement of the air filter 452, which position is visible in FIG. 8, to disengage them from the retaining bar Bt, in which position the air filter 452 can be extracted from the collecting pan 430, in the manner of a drawer as shown in FIG. 9.

For this purpose, each hook Cr incorporates a portion in the form of an arc of a circle dimensioned to catch on the cylindrical profile of the retaining bar Bt.

Each hook Cr at its opposite end to the common connecting axis A1 incorporates a profile in the form of a convex cam dimensioned to collaborate with the retaining bar Bt in order to move said hook away so that the circular-arc-shaped portion thereof can automatically catch on the cylindrical profile of the retaining bar Bt. This feature allows the air filter 452 to be blocked automatically on the collecting pan 430 as the latter is being moved back up if the operator has forgotten to re-close the applicator 600 onto said air filter. The closing of the applicator 600 is then brought about by the pressure of the frame Cd against the perimeter opening of the hood 442.

When the applicator 600 is in the disengagement position, it is thus possible to extract the air filter 452, in order to clean or replace it, as shown in FIG. 9.

One of the two hooks Cr is returned to the blocking position by a return means such as a spring.

In FIGS. 4, 11, 12 and 13, the industrial sweeper 100 of the invention is equipped with an unclogging mechanism Md for unclogging its air filter 452. The unclogging mechanism Md comprises an end-stop that is active at the end of the opening movement of the collecting pan 430, an unblocking lever Lv bringing about the opening of the collecting pan 430, under the effect of its mass, towards its wide open position.

In FIGS. 4, 11, 12 and 13, the end stop consists of a slider Cs which forms an end stop for the collecting pan 430 in its wide open position. It is mounted in an articulated manner and at one end on the collecting pan 430, via a common axis X1 that passes through the slider Cs and is held between the two flanges J of said collecting pan. The axis X1 is distanced from the articulation An and positioned on the other side of the air filter 452, so that it bears the majority of the mass of the collecting pan 430. The slider Cs extends obliquely upwards towards the rear of the industrial sweeper 100. The slider Cs is able to slide respectively along a second axis X2 that is transverse and secured to the chassis 200 of the industrial sweeper 100. For this purpose the slider Cs has passing through it a slot Rn in which the second axis X2 fits. The slot Rn has an L-shaped geometry with a long part P1 which extends along the length of the slider Cs and a short part Pc which extends the long part P1 at right angles and in the lower part thereof. The short part Pc extends upwards and across the width of said slider Cs. The end of the short part Pc of the slot Rn defines, by engaging on the second axis X2, such as a lock, the closed position of the box Cn. The end of the long part P1 of the slot Rn defines, in collaboration with the second axis X2, an end stop determining the wide open position of the box Cn and therefore the wide open position of the collecting pan 430.

The collecting pan 430 is able, when the lever Lv has been pivoted, of pivoting abruptly through its closed position to its open position thereby forcing the slider Cs to pivot about its axis X1 and forcing the slider Cs to slide along the second axis X2. Under the effect of its mass, the collecting pan 430 may thus open abruptly. The pivoting of the slider Cs is brought about by means of the lever Lv which is mounted in an articulated manner on the chassis 200 and at its middle about a third axis X3. At one end, and perpendicular to the lever Lv, said lever bears a bar Br and the lever Lv is positioned in such a way that the bar Br can rest against an edge face of the slider Cs when the bar Br is pivoted to disengage the short part Pc of the slider Cs from the clutches of the second axis X2.

The other end of the lever Lv emerges through an aperture that passes through a dorsal wall Ds that forms part of the chassis 200. This other end has passing through it a passage that allows the lever Lv to operate like a rocker Bs, pivoting about its third axis X3.

Thus, and with reference to FIG. 12, the unlocking of the collecting pan 430 is obtained by pulling on the rocker Bs, as suggested by the arrow F1, for example using a simple pole. The bar Br thus causes the slider Cs to pivot about the second axis X2, thus disengaging the short part Pc of the slot Rn. The slider Cs thus released, descends until the end of the long part P1 of the slot Rn abruptly comes into abutment with the second axis X2.

With reference to FIG. 13, this action causes the collecting pan 430 to open under the effect of gravity and to pivot about the articulation An towards its wide open position, as suggested by the arrow F2. The opening movement of the collecting pan 430 is interrupted abruptly by the shock of the end of the slot Rn when it strikes the second axis X2. This shock unclogs the air filter 452 which is kept clamped on the collecting pan 430, by the applicator 600. The dust ejected from the air filter 452 is thus collected in the collecting pan 430. No dust therefore spreads further to the outside of the industrial sweeper 100 and, in particular, in the region of the air filter 452. The machine surroundings remain clean. The suction chamber of the turbine 440 remains clean, and this reduces the maintenance operations on the industrial sweeper 100.

In order to bring the collecting pan 430 back up into its closed position, it is appropriate, with reference to FIG. 14, to lower the industrial sweeper 100 onto the floor S using the lifting vehicle. The slot Rn of the slider Cs then slides along the second axis X2 until the short part Pc traps it, like a lock, through the lowering of said slider Cs under the effect of its mass.

The collecting pan 430 thus closes again automatically.

In a first embodiment variant depicted in FIG. 10, the air filter 452 has a cylindrical geometry. It can be fixed to the air outlet opening 434 that forms part of the collecting pan 430. The air outlet opening 434 has a circular perimeter. It is bordered perpendicularly upwards by a circular upstand Rc in which the air filter 452 may be lodged.

Two seals Jt are fixed to the perimeter of the two, upper and lower, main faces of the air filter 452.

In this embodiment variant, the applicator comprises a ring bearing against the perimeter seal of the upper face of the air filter, the ring being held by two arms mounted in an articulated manner on the horizontal-axis articulation. Two hooks are fixed to the ring, for example using a bar, and on the other side of the arms, so as both to catch on a retaining bar connecting the two flanges of the collecting pan. In a second embodiment variant, which has not been depicted, the unclogging mechanism comprises a cable one end of which is fixed to the chassis of the industrial sweeper and the other end of which is fixed to the common axis (referenced X1 in FIGS. 4, 11, 12 and 13). The industrial sweeper 100 is equipped in this embodiment variant with a lock automatically blocking the collecting pan when it is returned to its closed position. The lock incorporates a retractable lock bolt. The unblocking of the lock causes the collecting pan to open. The cable then becomes taut and forms an end stop for the collecting pan. The abrupt shock produced at the end of the opening movement of the collecting pan unclogs the air filter.

In a third embodiment variant, which is not depicted, the unclogging mechanism comprises a first radial end stop borne by the shaft that forms part of the horizontal axis articulation (referenced An in FIGS. 4, 11, 12 and 13), and a fixed second end stop borne by the chassis of the industrial sweeper and collaborating with the radial end stop to limit the rotation of the collecting pan about its horizontal axis articulation to its wide open position.

Once again, the opening movement of the collecting pan is brought to an abrupt halt in its wide open position by the two end stops coming into contact with one another, causing the unclogging of the air filter fixed to the collecting pan.

The unclogging mechanism Md of the industrial sweeper is of a construction that is simpler and more reliable than in application FR3087798.

The dust ejected from the air filter 452 at the end of its unclogging remains confined in the collecting pan 430. The dust therefore no longer spreads around the industrial sweeper 100. The work of the industrial sweeper becomes less messy.

The invention claimed is:

1. An industrial sweeper designed to operate by rolling along a floor that is to be cleaned, pushed or pulled, comprising:
   a brush with an axis that is horizontal when considering a position of use of the industrial sweeper on a horizontal floor,
   a collecting pan intended to collect the dirt swept by the brush during operation of the industrial sweeper, the collecting pan being mounted with the ability to pivot about an articulation that is offset laterally from the centre of gravity of the collecting pan between a closed and working position of the industrial sweeper and a wide open position allowing the collecting pan to be emptied,
   a suction turbine situated downstream of the collecting pan to encourage, by suction, the dust to enter the collecting in the closed and working positions,
   two wheels intended to rest on the floor that is to be cleaned,
   an air filter, fixed directly to the collecting pan so that the air filter moves in a same way as the collecting pan moves when the collecting pan pivots, and
   an unclogging mechanism for unclogging the air filter, the unclogging mechanism comprising an end stop designed to block the travel of the collecting pan in the wide open position, the end stop causing an abrupt halt at the end of an opening movement of the collecting pan,
   wherein passage from the closed and working position to the wide open position occurs under the effect of gravity.

2. The industrial sweeper according to claim 1, wherein the collecting pan comprises a box of L-shaped cross section, provided with a intake opening, with an air outlet opening, the air filter being fixed around the air outlet opening and wherein, in the wide open position, the collecting pan is emptied through the intake opening.

3. The industrial sweeper according to claim 2, wherein two guideways for guiding the air filter are positioned opposite one another while being fixed to two transverse edges delimiting the air outlet opening, the air filter having a geometry in the shape of a parallelepiped or prism, the air filter being inserted between the two guideways.

4. The industrial sweeper according to claim 2, wherein the air filter is delimited by two open main faces uncovering the filter element, one of them being a lower face, for admitting air, and an upper face for letting filtered air out, two seals being fixed to the perimeter of the two main faces of the air filter, the air filter being fixed around the air outlet opening, via an applicator comprising a frame or a ring mounted in an articulated manner and able to bear against the perimeter seal of the upper face of the air filter.

5. The industrial sweeper according to claim 1, wherein the end stop comprises a slider mounted in an articulated manner via one end to the collecting pan by means of an axis common with the collecting pan, the slider having a slot configured to allow the slider to slide along a second axis secured to a chassis that forms part of the sweeper, the slot comprising a long part and the free end of which defines, in collaboration with the second axis, the end stop that determines the wide open position of the collecting pan.

6. The industrial sweeper according to claim 5, wherein the slot further comprises a short part which upwardly extends from the long part at a bottom portion of the slot, the end of the short part of the slot defining, by engaging a device on the second axis, the closed and working position of the box.

7. The industrial sweeper according to claim 1, wherein the unclogging mechanism comprises a cable one end of which is fixed to a chassis which forms part of the industrial sweeper and the other end of which is fixed to an axis common with the collecting pan, the cable forming an end stop for the opening movement of the collecting pan and thus determining the wide open position thereof, and wherein the industrial sweeper is equipped with a lock for automatically blocking the collecting pan when returned to the closed and working position, the lock including a retractable lock bolt.

8. The industrial sweeper according to claim 1, wherein the unclogging mechanism comprises a radial end stop borne by a shaft constituting the articulation, a fixed second end stop borne by a chassis that forms part of the industrial sweeper and that collaborates with the radial end stop in order to limit the rotation of the collecting pan about the articulation to the wide open position.

9. The industrial sweeper according to claim 1, further comprising two hydraulic pumps respectively rotationally driven by the two wheels of the industrial sweeper, three hydraulic motors coupled in series and supplied by the two hydraulic pumps to respectively drive the rotation of the horizontal-axis brush, a lateral brush and the suction turbine.

* * * * *